US012606490B2

(12) United States Patent
Kornmeyer et al.

(10) Patent No.: US 12,606,490 B2
(45) Date of Patent: Apr. 21, 2026

(54) PROCESS FOR PRODUCING MOULDED ARTICLES FROM CARBON OR GRAPHITE BY 3D PRINTING

(71) Applicant: Nippon Kornmeyer Carbon Group GmbH, Windhagen (DE)

(72) Inventors: Torsten Kornmeyer, Königswinter (DE); David Klein, Hennef (DE); Michael Gerads, Bonn (DE)

(73) Assignee: Nippon Kornmeyer Carbon Group GmbH, Windhagen (DE)

( * ) Notice: Subject to any disclaimer, the term of this patent is extended or adjusted under 35 U.S.C. 154(b) by 88 days.

(21) Appl. No.: 18/572,664

(22) PCT Filed: Jul. 5, 2022

(86) PCT No.: PCT/EP2022/068535
§ 371 (c)(1),
(2) Date: Dec. 20, 2023

(87) PCT Pub. No.: WO2023/280821
PCT Pub. Date: Jan. 12, 2023

(65) Prior Publication Data
US 2024/0286961 A1 Aug. 29, 2024

(30) Foreign Application Priority Data
Jul. 8, 2021 (DE) ..................... 10 2021 117 691.3

(51) Int. Cl.

| | |
|---|---|
| *C04B 35/52* | (2006.01) |
| *B29C 64/124* | (2017.01) |
| *B33Y 10/00* | (2015.01) |
| *B33Y 40/20* | (2020.01) |
| *B33Y 70/00* | (2020.01) |
| *B33Y 70/10* | (2020.01) |
| *C01B 32/205* | (2017.01) |
| *C04B 35/524* | (2006.01) |
| *C04B 35/626* | (2006.01) |
| *C04B 35/634* | (2006.01) |
| *C04B 35/636* | (2006.01) |
| *C04B 35/64* | (2006.01) |
| *B29C 64/35* | (2017.01) |
| *B29K 33/20* | (2006.01) |

(52) U.S. Cl.
CPC .......... *C04B 35/522* (2013.01); *B29C 64/124* (2017.08); *B33Y 10/00* (2014.12); *B33Y 40/20* (2020.01); *B33Y 70/00* (2014.12); *B33Y 70/10* (2020.01); *C01B 32/205* (2017.08); *C04B 35/524* (2013.01); *C04B 35/6267* (2013.01); *C04B 35/6269* (2013.01); *C04B 35/63444*
(2013.01); *C04B 35/636* (2013.01); *C04B 35/6365* (2013.01); *C04B 35/64* (2013.01); *B29C 64/35* (2017.08); *B29K 2033/20* (2013.01); *C04B 2235/3826* (2013.01); *C04B 2235/425* (2013.01); *C04B 2235/48* (2013.01); *C04B 2235/6026* (2013.01); *C04B 2235/6562* (2013.01); *C04B 2235/6567* (2013.01); *C04B 2235/658* (2013.01)

(58) Field of Classification Search
CPC ............................ C01B 32/205; C04B 35/524
See application file for complete search history.

(56) References Cited

U.S. PATENT DOCUMENTS

| | | | | |
|---|---|---|---|---|
| 6,155,331 | A * | 12/2000 | Langer ...................... | B22C 1/00 |
| | | | | 164/4.1 |
| 10,293,555 | B2 * | 5/2019 | Kojima ............... | C04B 35/6269 |
| 10,647,023 | B2 * | 5/2020 | Schmidt .................. | C04B 35/50 |
| 10,668,206 | B2 * | 6/2020 | Newell ................. | A61M 1/367 |
| 10,981,834 | B2 * | 4/2021 | Öttinger .................. | C04B 41/009 |
| 12,071,379 | B2 * | 8/2024 | Juma ...................... | B33Y 70/10 |

(Continued)

FOREIGN PATENT DOCUMENTS

| | | | | |
|---|---|---|---|---|
| CN | 110483050 | A * | 11/2019 | ........... C04B 35/524 |
| EP | 3359318 | B1 | 4/2020 | |

(Continued)

OTHER PUBLICATIONS

FIT (Foreign Image and Text) translation of CN 110483050 A, Nov. 22, 2019 (Year: 2019).*

(Continued)

*Primary Examiner* — Benjamin A Schiffman
(74) *Attorney, Agent, or Firm* — Smartpat PLC

(57) ABSTRACT

A process for 3D printing articles made of carbon or graphite includes producing a flowable polymeric mixture from a UV permeable and polymerizable polymer or cellulose and a UV crosslinkable resin, admixing the polymeric mixture with sugar and/or cellulose until the mixture has a consistency such that it can be filled into a 3D printer and processed thereby, homogenizing the mixture at room temperature or elevated temperature, filling a 3D printer with the mixture, layerwise printing a shaped article with simultaneous exposure to UV radiation for layerwise crosslinking of the UV crosslinkable resin, cleaning the shaped article, introducing the UV precured shaped article into a furnace and stabilizing the UV precured shaped article in air at a predetermined stabilizing temperature until all volatile constituents have outgassed from the prefabricated shaped article and subsequently high temperature treating the shaped article for carbonization or graphitization in a furnace under protective gas.

7 Claims, No Drawings

(56) References Cited

U.S. PATENT DOCUMENTS

| | | | |
|---|---|---|---|
| 12,187,649 B2 * | 1/2025 | Klein | C04B 35/524 |
| 2016/0114529 A1 | 4/2016 | Nakamura | |
| 2016/0160021 A1 | 6/2016 | Kojima et al. | |
| 2016/0325464 A1 | 11/2016 | Albers et al. | |
| 2018/0318489 A1 | 11/2018 | Newell et al. | |
| 2018/0346384 A1 | 12/2018 | Öttinger et al. | |
| 2019/0047173 A1 | 2/2019 | Schmidt | |
| 2024/0286961 A1 * | 8/2024 | Kornmeyer | C04B 35/6269 |
| 2024/0286962 A1 * | 8/2024 | Kornmeyer | C04B 35/6264 |

FOREIGN PATENT DOCUMENTS

| | | | | |
|---|---|---|---|---|
| WO | 9532824 A1 | 12/1995 | | |
| WO | 2018196965 A1 | 11/2018 | | |
| WO | WO-2020078328 A1 * | 4/2020 | | C30B 29/36 |
| WO | WO-2024088543 A1 * | 5/2024 | | C01B 32/205 |

OTHER PUBLICATIONS

FIT (Foreign Image and Text) translation of WO 2020078328 A1, Apr. 23, 2020 (Year: 2020).*
Liu, H. Clive, et al. "Rheological behavior of polyacrylonitrile and polyacrylonitrile/lignin blends." Polymer 111 (Jan. 21, 2017): 177-182. (Year: 2017).*
Wood, A. A. R. "Carbon and graphite." Concise encyclopedia of advanced ceramic materials. Pergamon, 1991. 57-62. (Year: 1991).*

* cited by examiner

PROCESS FOR PRODUCING MOULDED ARTICLES FROM CARBON OR GRAPHITE BY 3D PRINTING

CROSS-REFERENCE TO RELATED APPLICATION

This application is a national stage application, filed under 35 U.S.C. § 371, of International Patent Application PCT/EP2022/068535, filed on Jul. 5, 2022, which claims the benefit of German Patent Application DE 10 2021 117 691.3, filed on Jul. 8, 2021.

TECHNICAL FIELD

The disclosure relates to a process for producing shaped articles made of carbon or graphite by 3D printing.

BACKGROUND

Shaped articles made of graphite, which are also suitable for high temperature applications for example, may be any three-dimensional components, such as linings for furnaces, components of a construction or else any desired hollow bodies, such as seals, sliding bodies or the like.

Since the shaped articles cannot be produced by simple shaping of carbon black or graphite and subsequent sintering, it is generally necessary to produce a suitable carbonaceous and malleable composition. This commonly comprises mixing carbon black, cokes or graphites in the form of a granulate with a suitable binder, such as a thermoplastic binder. Contemplated binders also include pitch based on coal tar or petroleum pitch or else synthetic resins.

These mixtures are subsequently shaped into a so-called green blank by isostatic pressing in a suitable mold. The blank must then be removed from the mold, which is a quite critical operation because it can easily damage the blank.

This blank is then carbonized in a furnace at about 3000° C. to decompose the binder into volatile constituents. Carbon and binder coke remain as remnants of the binder in the form of a porous microstructure.

Alternatively, the green shaped article may also be arranged between electrodes in a furnace or the like as a resistance element and heated until complete carbonization by current flow.

It will be understood that such a process is relatively time-consuming to realize, wherein particularly the operation of withdrawing the blank from the mold is critical due to the low strength of the blank at this juncture. The components produced in this way are usually rotationally symmetric components. Three-dimensional components of complicated construction, also containing apertures or other openings, cannot be produced by such a process.

The finished carbonized components may finally also be subjected to mechanical aftertreatment, for example smoothing.

EP 3 359 318 B1 discloses a process for 3D printing of a 3-dimensional object comprising the steps of:
- providing a suspension comprising 50-95% by weight of the total suspension of at least one ceramic material and/or a solid carbonaceous material, wherein the carbonaceous material may consist of graphite, graphene, carbon nanotubes and other allotropes of carbon, and at least 5% by weight of the total suspension of one or more fatty acids;
- 3D printing of the desired object using the suspension as a starting material, wherein the 3D printing process may comprise robocasting, direct ink writing, inkjet printing, binder jetting, selective heat sintering, selective laser sintering, selective laser melting, stereolithography, filament printing, pellet printing, powder printing, free-form manufacturing, rapid prototyping or deposition from a robotic arm;
- consolidating the printed material by a process selected from the group consisting of sintering, melting and/or infiltrating the 3D printed material.

Here too, the relatively low stability of the printed blank is critical as regards further handling before consolidation.

In terms of further publications of the general prior art WO 95/32824 A1 relates to a process for use in foundry technology. The process is used to produce a casting mold from a thermally curable material by layerwise selective consolidation of layers of mold material by exposure to electromagnetic radiation. The mold material consists of a material inert toward electromagnetic radiation and a second material curable by electromagnetic radiation, by means of which the mold material is solidified.

The first material consists of various sands, carbon sand, quartz material, or of metal or ceramic powder, and the second material consists of various resins.

Furthermore, US 2016/0114529 A1 relates to an apparatus for production of a three-dimensional object carried out by laminating layers using a resin crosslinkable by UV radiation and subsequent heat treatment.

Finally, US 2019/0047173 A1 describes a process and material for additive manufacturing of a ceramic-containing material. To this end the ceramic-containing material is mixed with a curable resin in a predetermined ratio and applied layerwise with a 3D printer.

SUMMARY

It is an object of the disclosure to provide a process for producing shaped articles made of carbon or graphite by 3D printing which is particularly easy to realize and which also makes it possible to produce complex shaped articles without mechanical aftertreatment.

This is achieved by a process for producing shaped articles made of carbon or graphite by
- producing a flowable polymeric mixture from a UV permeable and polymerizable polymer or cellulose and a UV crosslinkable resin, wherein the polymeric mixture is admixed with sugar and/or cellulose until the mixture has a consistency such that it may be filled into a 3D printer and processed thereby,
- homogenizing the mixture at room temperature or elevated temperature up to about 60° C.,
- filling a 3D printer with the mixture,
- layerwise printing a shaped article with the 3D printer with simultaneous exposure to UV radiation for layerwise crosslinking of the UV crosslinkable resin,
- cleaning the shaped article, especially of liquid residues and foreign particles,
- introducing the shaped article into a furnace and stabilizing the UV precured shaped article in air at a predetermined stabilizing temperature until all volatile constituents have outgassed from the prefabricated shaped article and
- subsequently high temperature treating the shaped article for carbonization or graphitization in a furnace under protective gas.

The flowable polymeric mixture of a UV permeable and polymerizable polymer or cellulose may also have a solvent admixed with it.

The stabilizable polymer employed is polyacrylonitrile (PAN) which may have been dissolved in a solvent.

Contemplated solvents include dimethyl sulfoxide (DMSO), dimethylformamide (DMF) or N-methyl-2-pyrrolidone (NMP), wherein DMSO is preferred on account of its lower health hazard.

In a development of the invention the stabilizing of the precured shaped article is carried out by uniform heating thereof in the furnace up to a stabilization temperature and subsequent short duration heat treatment at constant temperature.

It is preferable when the stabilizing of the prefabricated shaped article is undertaken over a duration of two or more hours according to the size of the shaped article at a temperature of 200° C. to not more than 450° C. and preferably of 250° C.

In one embodiment the carbonization of the shaped article is carried out in the furnace under protective gas or under vacuum at a temperature of about 1000° C.

In a further embodiment the graphitization is carried out in the furnace under protective gas or under vacuum at a temperature from 2000° C., wherein a full graphitization is carried out at a temperature of >2500° C.

The graphitization of the shaped article is preferably carried out at a pressure of 700 mbar under argon as protective gas or under vacuum with a heating ramp of 1° C./min.

The polymeric mixture may also be admixed with a metal or silicon oxide so that after prefabricating of the shaped article with the 3D printer and subsequent stabilization thereof a high temperature treatment at >1000° C. may be undertaken to form metal or silicon carbides, wherein care must be taken to ensure that the mixture does not become nontransparent for UV radiation as would be the case upon admixture of pitch for example. The metal or silicon oxides are generally UV transparent, thus allowing UV radiation to be readily transmitted.

It is in principle alternatively also possible to admix pure silicon or pure metal to the polymeric mixture although this limits printing to only thin layers due to the very low penetration depth of the UV radiation.

DETAILED DESCRIPTION

The invention will now be more particularly elucidated with reference to a working example.

For production of shaped articles made of graphite with a 3D printer it is necessary to initially produce a polymeric mixture of a stabilizable polymer and a UV crosslinkable resin, wherein the polymeric mixture is admixed with sugar and/or cellulose until the polymeric mixture has a consistency amenable to processing with a 3D printer.

The flowable polymeric mixture of a UV permeable and polymerizable polymer or cellulose may also have a solvent, such as DMSO, admixed with it.

The stabilizable polymer employed is polyacrylonitrile (PAN) which may have been dissolved in a solvent.

Instead of polyacrylonitrile (PAN) it is in principle also possible to employ other polymerizable and thus stabilizable polymers or cellulose. However this is provided that the employed polymers or the cellulose are permeable to UV radiation.

It is also possible in principle to dissolve the polyacrylonitrile (PAN) in a solvent or to completely replace it with cellulose.

Contemplated solvents include dimethyl sulfoxide (DMSO), dimethylformamide (DMF) or N-methyl-2-pyrrolidone (NMP), wherein DMSO is preferred on account of its lower health hazard.

The UV crosslinkable resin may be a DLP photopolymer resin or an SLA resin or else any other suitable UV transparent resin.

The polymeric mixture may additionally also be admixed with metal oxides, such as silicon oxide, wherein care must be taken to ensure that the mixture does not become nontransparent for UV radiation as would be the case upon admixture of pitch for example.

Subsequently, a shaped article is produced by layerwise printing of the polymeric mixture with a 3D printer with simultaneous exposure to UV radiation for layerwise crosslinking of the UV sensitive resin.

For layerwise crosslinking of the UV sensitive resin the radiation of a projector whose UV filter has been removed is sufficient.

The thus produced precured shaped article is immediately thereafter stabilized in a furnace at a temperature of 200° C. to not more than 450° C., preferably at a temperature of 250° C., in air to outgas volatile constituents from the precured shaped article.

It is only by using the UV sensitive resin that is crosslinked/cured by exposure to UV radiation that it is possible to print a shaped article which during the printing operation achieves a sufficient stability to allow handling thereof for the further production steps.

The stabilizing of the UV cured shaped article is carried out by uniform heating of the shaped article in the furnace up to the stabilizing temperature and subsequent short duration heat treatment at constant temperature until all volatile constituents of the mixture have outgassed.

The stabilizing is preferably carried out over a duration of two or more hours according to the size of the shaped article.

For the subsequent graphitization the furnace is further heated to a temperature necessary for complete graphitization. After stabilizing, the prefabricated shaped article is carbonized in the furnace under protective gas or under vacuum at a temperature of about 1000° C.

Alternatively, the prefabricated shaped article may be graphitized in the furnace under a protective gas or under vacuum at a temperature from 2000° C., wherein a full graphitization may be achieved at a temperature of >2500° C.

The graphitization of the shaped article is preferably carried out at a pressure of 700 mbar under argon as protective gas or under vacuum with a heating ramp of 1° C./min, wherein other noble gases such as neon, krypton, xenon may also be employed in principle.

The invention claimed is:

1. A process for producing non-ceramic shaped articles made of carbon or graphite by 3D printing, comprising:
   producing a base polymeric mixture consisting of
      a UV permeable and polymerizable polyacrylonitrile dissolved in a solvent selected from the group consisting of dimethyl sulfoxide (DMSO), dimethylformamide (DMF), and N-methyl-2-pyrrolidone (NMP), and
      a UV crosslinkable resin selected from the group consisting of DLP photopolymer resin and SLA resin; thereafter
   admixing sugar and/or cellulose to the base polymeric mixture, the sugar and/or cellulose being added in an amount sufficient to impart a flowable consistency suitable for being filled into and processed by a 3D printer, thereby forming a flowable polymeric mixture;

homogenizing the flowable polymeric mixture at an elevated temperature up to 60° C.;

filling a 3D printer with the flowable polymeric mixture;

layerwise printing a shaped article with the 3D printer with simultaneous exposure to UV radiation for layerwise crosslinking of the UV crosslinkable resin, thereby forming a UV precured shaped article;

cleaning the UV precured shaped article of to remove liquid residues and foreign particles;

introducing the UV precured shaped article into a furnace and stabilizing the UV precured shaped article in air at a predetermined stabilizing temperature of 200° C. to 450° C. until all volatile constituents have outgassed, thereby forming a prefabricated shaped article; and subsequently high temperature treating the prefabricated shaped article for carbonization or graphitization in a furnace under protective gas.

2. The process as claimed in claim 1, wherein the stabilizing of the UV precured shaped article is carried out by uniform heating of the precured shaped article in the furnace up to a predetermined stabilizing temperature and subsequent short duration heat treatment at constant temperature.

3. The process as claimed in claim 2, wherein the stabilizing of the prefabricated shaped article is undertaken over a duration of two or more hours at a temperature of 250° C.

4. The process as claimed in claim 1, wherein after stabilizing, the prefabricated shaped article is carbonized in the furnace under protective gas or under vacuum at a temperature around 1000° C.

5. The process as claimed in claim 4, wherein the carbonization or graphitization of the prefabricated shaped article is undertaken at a pressure of 700 mbar under argon as protective gas with a heating ramp of 1° C./min.

6. The process as claimed in claim 1, wherein the prefabricated shaped article is graphitized in the furnace under a protective gas or under vacuum at a temperature from 2000° C.

7. The process as claimed in claim 1, wherein a full graphitization of the prefabricated shaped article is performed under a protective gas or under vacuum at a temperature of >2500° C.

* * * * *